US012285944B2

(12) United States Patent
Riley et al.

(10) Patent No.: US 12,285,944 B2
(45) Date of Patent: Apr. 29, 2025

(54) SYSTEM, METHOD AND APPARATUS OF APPLYING, WITH A PRINTHEAD OF A PRINTING SYSTEM, INK TO A SUBSTRATE BASED ON A DISTANCE THE PRINTHEAD HAS MOVED

(71) Applicant: The Boeing Company, Chicago, IL (US)

(72) Inventors: Terrell Diane Riley, Summerville, SC (US); Edward Greene, Charleston, SC (US); Frederick B. Frontiera, Rochester, MI (US); Sean Auffinger, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/469,208

(22) Filed: Sep. 8, 2021

(65) Prior Publication Data

US 2023/0072353 A1 Mar. 9, 2023

(51) Int. Cl.
*B41J 2/045* (2006.01)
*B41J 11/00* (2006.01)

(52) U.S. Cl.
CPC ....... *B41J 2/04556* (2013.01); *B41J 2/04581* (2013.01); *B41J 11/00214* (2021.01)

(58) Field of Classification Search
None
See application file for complete search history.

(56) References Cited

U.S. PATENT DOCUMENTS 5,434,602 A * 7/1995 Kaburagi ............... B41J 19/305 33/708
7,922,272 B2 * 4/2011 Baird ..................... B41J 3/4073 118/305
8,613,493 B1 * 12/2013 Burke ........................ B41J 3/36 347/41
10,000,065 B1 6/2018 Baker et al.
2006/0044376 A1 * 3/2006 Baird ................. B41J 11/00212 347/102
2014/0352183 A1 * 12/2014 Gelus ...................... D06F 75/22 38/77.8
2016/0052261 A1 * 2/2016 Goyal ........................ B41J 3/36 347/14
2016/0229173 A1 * 8/2016 Boyksen ............... G03F 7/2016
2020/0079110 A1 * 3/2020 Hirata ........................ B41J 3/36
2021/0228757 A1 * 7/2021 Vasefi ....................... A61L 2/10

FOREIGN PATENT DOCUMENTS

EP 2799150 B1 4/2016
WO 2018/081871 A1 5/2018

OTHER PUBLICATIONS

Extended European Search Report, Application No. 22193642.0, Mailed May 9, 2023.
Partial European Search Report, Application No. 22193642.0, Mailed Feb. 6, 2023.

* cited by examiner

*Primary Examiner* — Alejandro Valencia
(74) *Attorney, Agent, or Firm* — Yee & Associates, P.C.

(57) ABSTRACT

Systems, apparatuses and methods provides for technology that applies, with a printhead of a printing system, ink to a substrate as the substrate remains stationary and the printhead moves across the substrate. The technology determines, with a distance encoder, a distance that the printhead has moved, and controls application of the ink from the printhead to the substrate based on the distance.

20 Claims, 10 Drawing Sheets

SYSTEM, METHOD AND APPARATUS OF APPLYING, WITH A PRINTHEAD OF A PRINTING SYSTEM, INK TO A SUBSTRATE BASED ON A DISTANCE THE PRINTHEAD HAS MOVED

FIELD

Examples generally relate to inkjet printing on varied surfaces of substrates with a portable printer. More particularly, examples relate to a printing system that includes a portable printing apparatus that can print in any orientation and a controller that controls printing.

BACKGROUND

Applying markings, such as decorative or non-decorative, to substrates (e.g., aircrafts) can be a time consuming process. For example, some methods include a stenciling process to apply an exterior marking (e.g., a warning, instructions, bi-lingual text, etc.). The stenciling process can labor intensive and error prone. The difficulty can be magnified in view of the number of stencils (e.g., hundreds of unique, disposable stencils) that are created for each aircraft. Stencils, especially bi-lingual stencils, can have very fine details, which must be preserved throughout the entire application process. For example, the omission of a single letter could alter a warning. Further, a stencil artist could possibly commit an error when stenciling in an unfamiliar language, which limits efficiency and reliability. Moreover, some known attempts at replacing the stenciling process with printing processes can result in inferior fidelity and substandard quality (e.g., illegible and/or short lifespan of the markings).

SUMMARY

In accordance with one or more examples, provided are a printing system comprising a printhead configured to apply ink to a substrate. The printhead includes a distance encoder that identifies a distance that the printhead has moved. The printing system includes a reservoir coupled to the printhead to supply ink to the printhead, a controller that provides one or more control signals to the printhead to control application of the ink to the substrate based on the distance, and a guide rail system to releasably attach to the substrate and guide the printhead over a printing area of the substrate.

In accordance with one or more examples, provided is an inkjet printing apparatus. The inkjet printing apparatus includes a printhead configured to apply ink to a substrate and receive one or more control signals. The printhead includes a distance encoder that identifies a distance that the printhead has moved. The one or more control signals are associated with application of the ink from the printhead to the substrate based on the distance. The inkjet printing apparatus further includes a reservoir coupled to the printhead to supply ink to the printhead.

In accordance with one or more examples, provided is a method including applying, with a printhead of a printing system, ink to a substrate as the substrate remains stationary and the printhead moves across the substrate. The method further includes determining, with a distance encoder, a distance that the printhead has moved, and controlling application of the ink from the printhead to the substrate based on the distance.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The various advantages of the examples will become apparent to one skilled in the art by reading the following specification and appended claims, and by referencing the following drawings, in which:

DESCRIPTION

Figure 1:
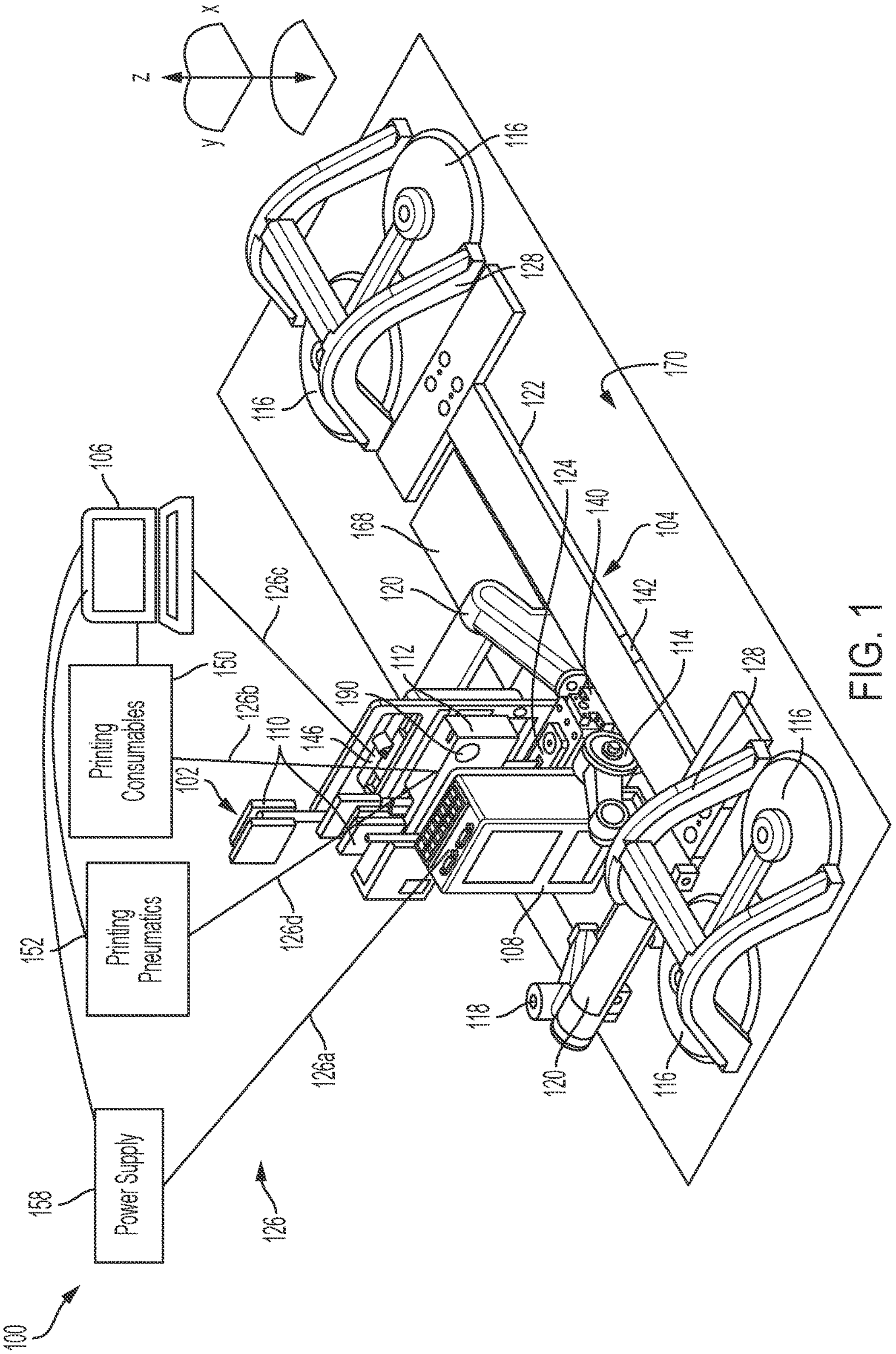
FIG. 1 is an illustration of an example of a portable inkjet printing system.

Turning now to FIG. 1, a portable inkjet printing system 100 is illustrated. The portable inkjet printing system 100 is operable by a single user. As will be described in further detail below, the portable inkjet printing system 100 can be used to replace known stenciling processes. Doing so can increase efficiency while maintaining high quality images.

The portable inkjet printing system 100 includes a handheld inkjet printer 102 (e.g., an inkjet printing apparatus). The portable inkjet printing system 100 can further include a guide rail system 104. The portable inkjet printing system 100 can further include a computing device 106 (e.g., a controller that is a laptop, desktop, mobile device, etc.). The portable inkjet printing system 100 can further include a power supply 158, printing pneumatics 152, and/or printing consumables 150. The guide rail system 104 is releasably coupled with a substrate 170 (e.g., an aircraft, curved surface, flat surface, etc.) and guides the handheld inkjet printer 102 over a printing area 168 of the substrate 170 as the handheld inkjet printer 102 is moved. The computing device 106 controls the handheld inkjet printer 102 to create markings directly on the printing area 168 of the substrate 170 as the handheld inkjet printer 102 is moved over the printing area 168.

For example, the handheld inkjet printer 102 can be adapted for printing directly to large, three dimensional objects such as in an aircraft production environment. In some examples, the handheld inkjet printer 102 is adapted to additionally print on smaller surfaces. The handheld inkjet printer 102 can print in one color, or in multiple colors if desired.

The handheld inkjet printer 102 includes a dynamic ink supply reservoir 112 that includes a pressure sensor and/or pressure controller 190 for meniscus control. The dynamic ink supply reservoir 112 automatically compensates for printhead 124 motion and orientation by controlling a meniscus associated with the printhead 124. That is, the dynamic ink supply reservoir 112 dynamically manages pressure in the dynamic ink supply reservoir 112 based on an orientation of the printhead 124 (e.g., piezoelectric printhead) of the handheld inkjet printer 102. As a result, a level of a meniscus in a nozzle of the printhead 124 is maintained, regardless of an orientation of the printhead 124 to facilitate printing in any orientation and on any surface while reducing detrimental effects, such as weeping and/or air ingestion, which undesirably interrupt printing.

For example, the dynamic ink supply reservoir 112 can be operated such that input data to control the meniscus pressure can be provided by an accelerometer or a pressure sensor of the handheld inkjet printer 102. The accelerometer or sensor provides positional data of where a tool center point (TCP) of the handheld inkjet printer 102 is located and how the handheld inkjet printer 102 is moving. The pressure sensor is plumbed into the ink path at the inlet and outlet of the printhead 124. In some examples, the dynamic ink supply reservoir 112 does not need to be located on the printhead 124, but can be located remote to the printhead 124 and connected to the printhead 124 through a cable.

As illustrated, the portable inkjet printing system 100 is arranged in a dispersed fashion. For example, the portable inkjet printing system 100 includes a plurality of flexible cables 126 that connect the handheld inkjet printer 102 to the power supply 158, the printing consumables 150, the printing pneumatics 152, and the computing device 106. Thus, the handheld inkjet printer 102 can be located distal to the power supply 158, the printing consumables 150, the printing pneumatics 152, and the computing device 106. Further, the handheld inkjet printer 102 can move relative to the power supply 158, the printing consumables 150, the printing pneumatics 152, and the computing device 106. The power supply 158, the printing consumables 150, the printing pneumatics 152, and the computing device 106 can be disposed on a cart or other moveable feature.

As a result, the handheld inkjet printer 102 is handheld since several components do not need to be mounted and/or supported on the handheld inkjet printer 102 during operation. Thus, an operator can control, maneuver, and support the handheld inkjet printer 102. For example, the handheld inkjet printer 102 includes one or more handles 120 that can be gripped by an operator to guide, support, and move the handheld inkjet printer 102.

As illustrated, a first flexible cable **126*a* couples the power supply 158 to the handheld inkjet printer 102 so that the power supply 158 transmits power to the handheld inkjet printer 102 through the first flexible cable 126*a*. A second flexible cable 126*b* connects the handheld inkjet printer 102 to the printing consumables 150. The printing consumables 150 provides ink to the handheld inkjet printer 102 through the second flexible cable 126*b*. Additionally, the handheld inkjet printer 102 recirculates ink back to the printing consumables 150 through the second flexible cable 126*b***.

The computing device 106 is connected with the handheld inkjet printer 102 to control printing operations of the handheld inkjet printer 102 through a third flexible cable **126*c*. The printing pneumatics 152 is connected to the handheld inkjet printer 102 through a fourth flexible cable 126*d*. The printing pneumatics 152 provides air or gas to the handheld inkjet printer 102** for printing operations.

The handheld inkjet printer 102 includes a driver card 146 coupled with the computing device 106 to drive printing the operations. For example, the computing device 106 can provide a series of commands, images, instructions etc. to the driver card 146 for execution and/or printing by the handheld inkjet printer 102. The commands are associated with printing operations (e.g., print specific text).

The handheld inkjet printer 102 includes strain reliefs 110. The strain reliefs 110 are incorporated into the cable management system for the plurality of flexible cables 126 to enable movement through many orientations without breaking an electrical, command or fluid connection.

To facilitate an operator printing in a straight line over an area, the portable inkjet printing system 100 includes the guide rail system 104. The guide rail system 104 includes a guide rail 122 (can be single or double swath). The guide rail system 104 is a flexible guide rail system to slidably support and guide the handheld inkjet printer 102 to ensure the correct printing path is followed by the operator. For example, the guide rail 122 has sufficient flexibility to match a shape (e.g., curvature) of an underlying surface and has sufficient firmness to support the handheld inkjet printer 102 without bending or buckling. The guide rail system 104 comprises a pair of flexible mounting members 116 (e.g., suction cups) coupled to each end of the guide rail 122 to releasably attach to any surface (e.g., a curved or flat surface). The handheld inkjet printer 102 slides on and in direct contact with the guide rail system 104. The pair of flexible mounting members 116 are attached to flexible brackets 128 that are able to be swiveled to conform to curved surfaces.

In some examples, the handheld inkjet printer 102 senses a trigger on the guide rail system 104 to determine when to print. For example, the handheld inkjet printer 102 includes a sensor 140 that senses and/or detects a triggering feature 142 (e.g., a magnetic device, an optical device, a distinctive marking, etc.), on the guide rail 122 to determine when to print and a location of the printing area 168. For example, the sensor 140 can be an optical or magnetic sensor, and the triggering feature 142 can be a corresponding optical or magnetic trigger to initiate a print to send a signal to the printhead 124 to apply ink in response to the triggering feature 142 being detected. For example, the handheld inkjet printer 102 can download instructions from the computing device 106 prior to printing and execute the instructions when the print is triggered by sensing the triggering feature 142 with the sensor 140. In some examples, the triggering feature 142 is a metal triggering feature, and the sensor 140 is a magnetic detector. Thus, the handheld inkjet printer 102 can detect a triggering feature 142 and prints in response to the triggering feature 142 being detected.

In some examples, the guide rail system 104 includes a corresponding print stop feature. The sensor 140 can sense when the print stop feature is reached and pause a printing process. The operator can then reposition the guide rail system 104 to continue printing and complete a printing process.

In some examples, the handheld inkjet printer 102 includes a printer actuation button 144 (FIG. 2) that is operable by a user to initiate printing. The printer actuation button 144 can be depressed when the user is prepared to begin printing and can be used in place of or in conjunction with the triggering feature 142 and the sensor 140. For example, the printer actuation button 144 can be depressed by a user to indicate that a printing operation is to be initiated. The printing operation can then begin when the sensor 140 senses the triggering feature 142. Thus, the printer actuation button 144 can serve as a safety mechanism to ensure that printing is not started if the user accidently passes the sensor 140 proximate to the triggering feature 142 so that the sensor 140 senses the triggering feature 142.

The ink can be an ultraviolet (UV) curable ink that is cured after printing. Thus, the handheld inkjet printer 102 includes a UV lamp 108. The UV lamp 108 cures the ink after printing and is thus disposed adjacent to the printhead 124. For example, the UV lamp 108 follows the printhead 124 in a direction of printing to cure the ink that the printhead 124 has already printed to the substrate 170.

Figure 3:
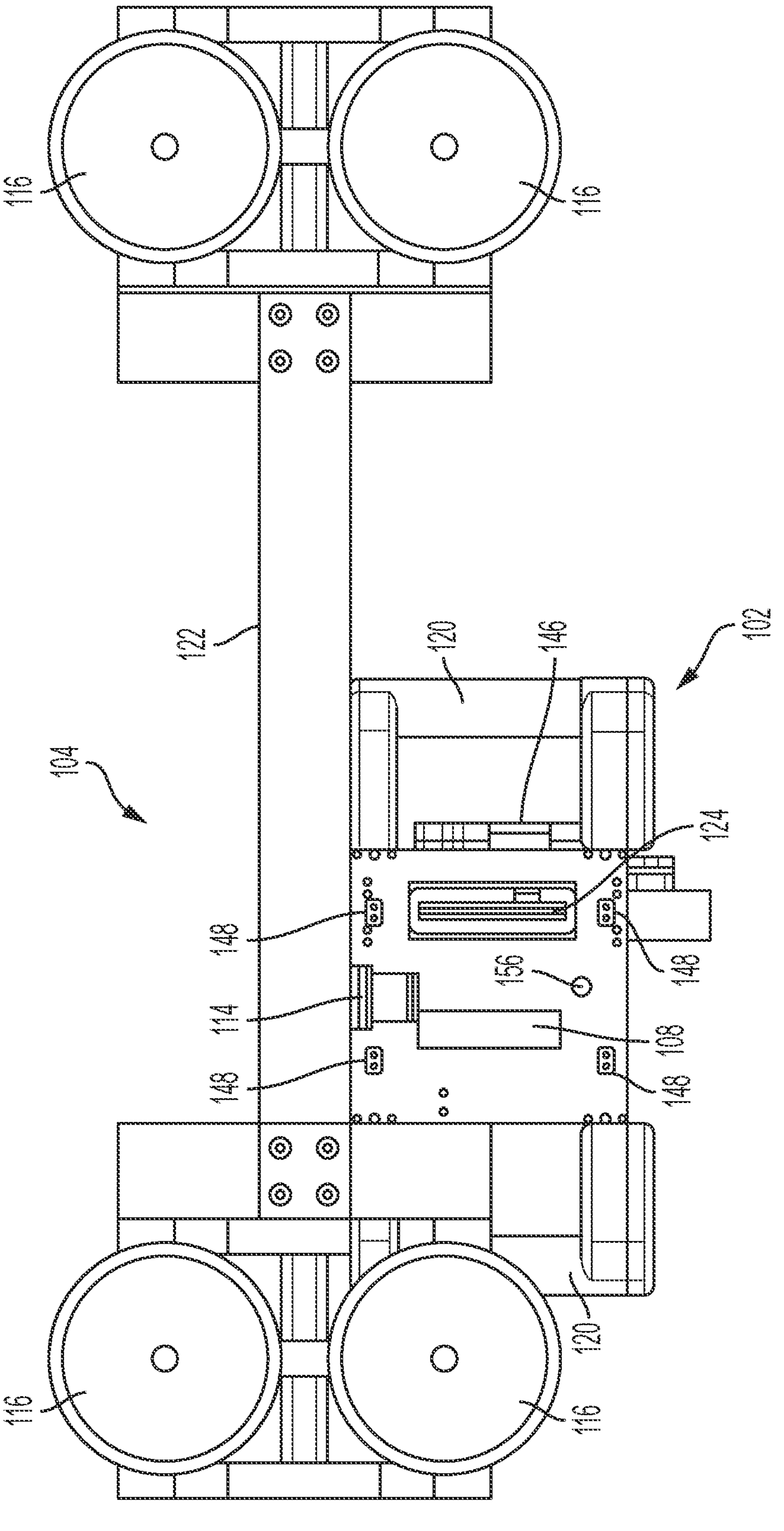
FIG. 3 is an illustration of a bottom view of the handheld inkjet printer.
Figure 5:
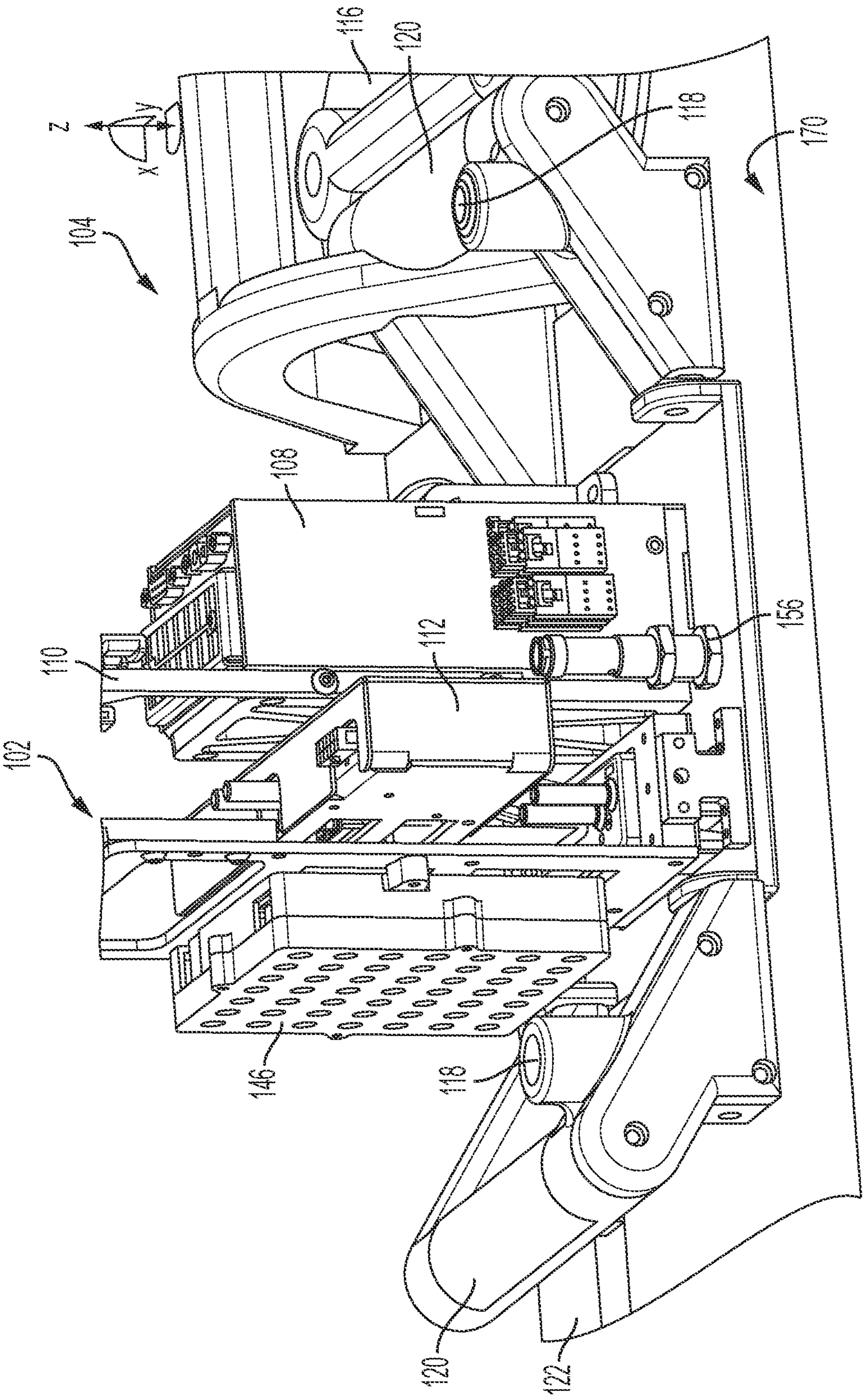
FIG. 5 is an illustration of a magnified side view of the handheld inkjet printer.

The handheld inkjet printer 102 includes safety features to enhance operator safety. For example, the handheld inkjet printer 102 includes a safety interlock that uses a distance sensor/proximity sensor 156 next to the printhead 124 to determine the distance between the UV lamp 108 and the substrate 170. For example, FIGS. 3 and 5 illustrate the distance sensor/proximity sensor 156. When the distance is below a threshold (e.g., the substrate 170 being within a predetermined distance), the UV lamp 108 is enabled. When the distance is above a threshold, the UV lamp 108 is outside of a safe distance for operation and thus the UV lamp 108 is disabled and cannot be actuated.

Once the distance is below the threshold, the operator can control the actuation of the UV lamp 108 through a UV user interface button 118. The UV user interface button 118 actuates the UV lamp 108. Thus, to actuate the UV lamp 108, the distance must be below the threshold and the UV user interface button 118 is depressed. In some examples, the operator can depress the UV user interface button 118 once and then release the UV user interface button 118 to turn on the UV lamp 108. The UV lamp 108 can then remain actuated until the UV user interface button 118 is depressed again or the distance increases to be above the threshold distance.

In some examples, the computing device 106 can provide instructions associated with the UV lamp 108 to the handheld inkjet printer 102. For example, the UV lamp 108 can turn on and off in accordance with the instructions. For example, if a gap exists between words printed by the handheld inkjet printer 102, the UV lamp 108 does not need to be turned on during the gap since there is no lettering to cure within the gap. Thus, the instructions can command the UV lamp 108 to turn off during the gap, and then turn on when the UV lamp 108 is over another word. It is worthwhile to mention that when the UV lamp 108 is controlled based on the instructions, the UV user interface button 118 can be bypassed so that the UV lamp 108 is actuated based only on the distance and the instructions without feedback from the UV user interface button 118. Alternatively, the user can depress the UV user interface button 118 once to begin the curing process and cause the UV lamp 108 to be controlled based on the instructions as described above during the curing process. The ink can be cured in a short period of time by the UV lamp 108. Thus, the ink can have good adhesion and durability on exterior coatings when covered with a clear coat.

To facilitate ink deposition and ink curing, the handheld inkjet printer 102 further includes a distance encoder 114 (e.g., wheel encoder). The distance encoder 114 is designed to maintain contact with the surface of the substrate 170 at all times and to provide positional feedback to the handheld inkjet printer 102 and/or the computing device 106. The handheld inkjet printer 102 prints based on the positional feedback to print at appropriate locations to form the intended design.

For example, since the operator can move the handheld inkjet printer 102 at different speeds, the speed alone cannot be determinative of when to print. Thus, the positional feedback is used to determine when to print so that the operator can move the handheld inkjet printer 102 at any speed (including varying speeds) throughout the printing process and still accurately print. Thus, the positional feedback is used to determine when to print. In some examples, the distance encoder 114 is replaced with a laser encoder that functions similarly to provide positional feedback. The UV lamp 108 can also be controlled based on the positional feedback to actuate at appropriate areas that have ink and turn off at areas devoid of ink.

In some examples, the handheld inkjet printer 102 also comprises a plurality of spacers 148 that are precision wheels or bumpers to improve motion and to provide standoff (e.g., offset) distance of the handheld inkjet printer 102 to the substrate 170. FIG. 3 is a bottom view of the handheld inkjet printer 102 and the guide rail system 104. The spacers 148 maintain the handheld inkjet printer 102 at a constant standoff distance and allows the handheld inkjet printer 102 to move smoothly over the substrate 170. The plurality of spacers 148 can be placed on the bottom of the handheld inkjet printer 102 such that the handheld inkjet printer 102 can be maintained at a constant distance from the substrate 170 while printing over the printing area 168. The plurality of spacers 148 can be biased with a springs to facilitate printing on curved surfaces. For examples, the plurality of spacers 148 are individually moveable relative to other portions of the handheld inkjet printer 102, including other spacers 148, to print on uneven surfaces.

Thus, the portable inkjet printing system 100 includes the guide rail system that slidably 104 that supports the printhead 124 to guide the printhead 124 over a printing area 168 of a substrate 170. The portable inkjet printing system 100, further includes the sensor 140 that detects a triggering feature 142 on the guide rail system 104, and the computing device 106 (e.g., a controller) controls the printhead 124 to apply the ink in response to the triggering feature 142 being detected. The sensor 140 is a magnetic sensor or an optical sensor. The guide rail system 104 includes a guide rail 122 and a plurality of mounting members coupled to the guide rail 122, where a plurality of the pair of flexible mounting members 116 is configured to releasably attach to the substrate 170.

As noted, the portable inkjet printing system 100 further includes the distance sensor/proximity sensor 156 to detect when the substrate 170 is within a predetermined distance of the UV lamp 108. The portable inkjet printing system 100 further includes the UV lamp 108 provide UV light to cure ink deposited by the portable inkjet printing system 100. The computing device 106 (e.g., a controller) provides one or more control signals to control the UV lamp 108 to provide the UV light based on the substrate 170 being within the predetermined distance. The portable inkjet printing system 100 further includes one or more handles 120 coupled to the printhead 124, the one or more handles 120 being configured for gripping by an operator guiding the printhead 124 across the printing area 168 of the substrate 170. The portable inkjet printing system 100 further includes one or more buttons, such as the UV user interface button 118 and the printer actuation button 144, on the one or more handles 120 to control operations of the portable inkjet printing system 100.

The handheld inkjet printer 102 (e.g., an inkjet printing apparatus) includes one or more spacers 148 to maintain an offset distance between the printhead 124 and the substrate 170. The one or more spacers 148 can include one or more wheels. One of the one or more wheels can be a distance encoder 114. In some examples, the distance encoder 114 is a laser encoder. The printhead 124 is a piezoelectric printhead. The dynamic ink supply reservoir 112 includes the pressure controller 190 to control a meniscus pressure of the printhead 124 and adjust the meniscus pressure based on an orientation of the printhead 124.

Figure 2:
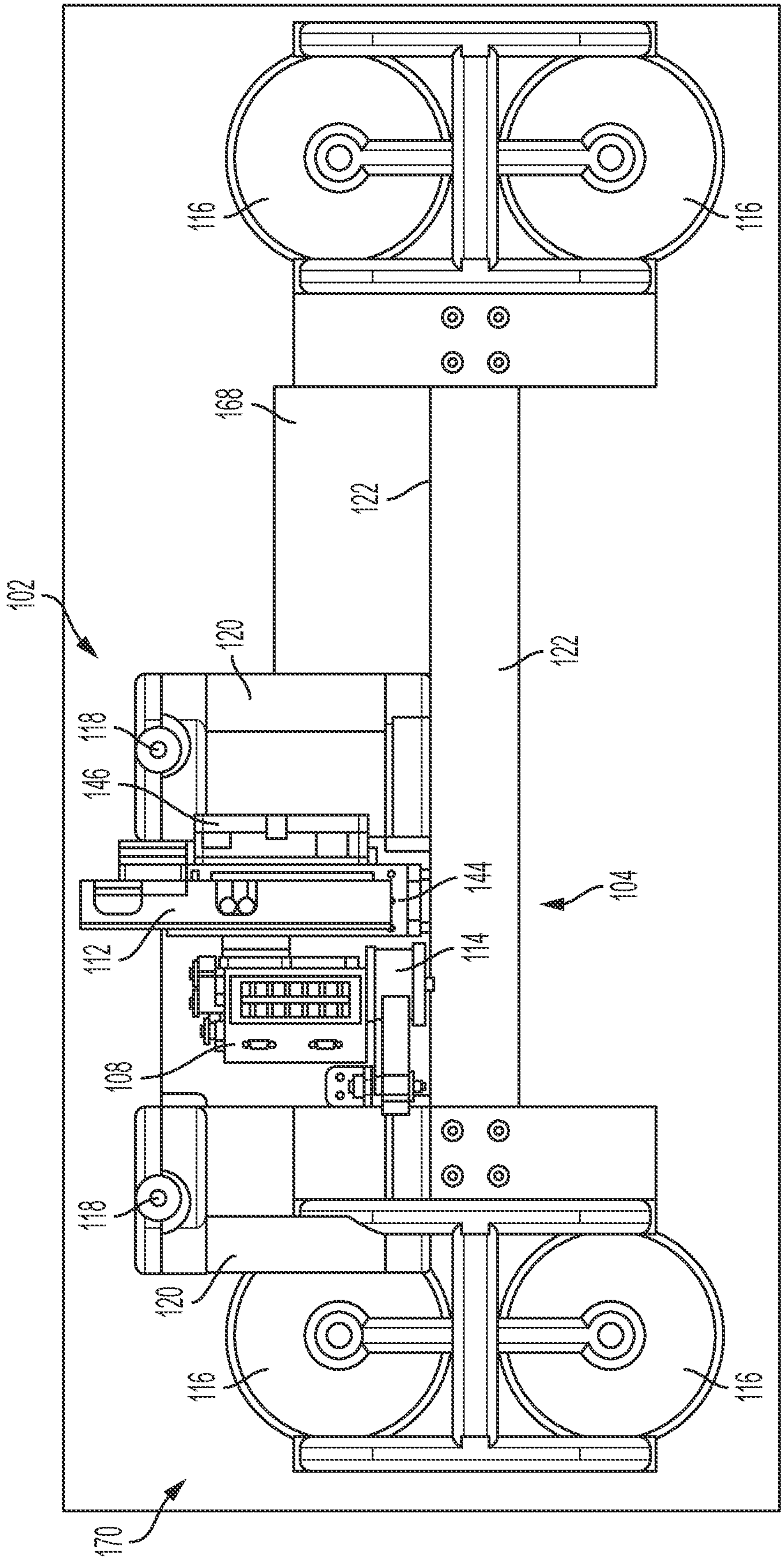
FIG. 2 is an illustration of an overhead view of the handheld inkjet printer.
Figure 4:
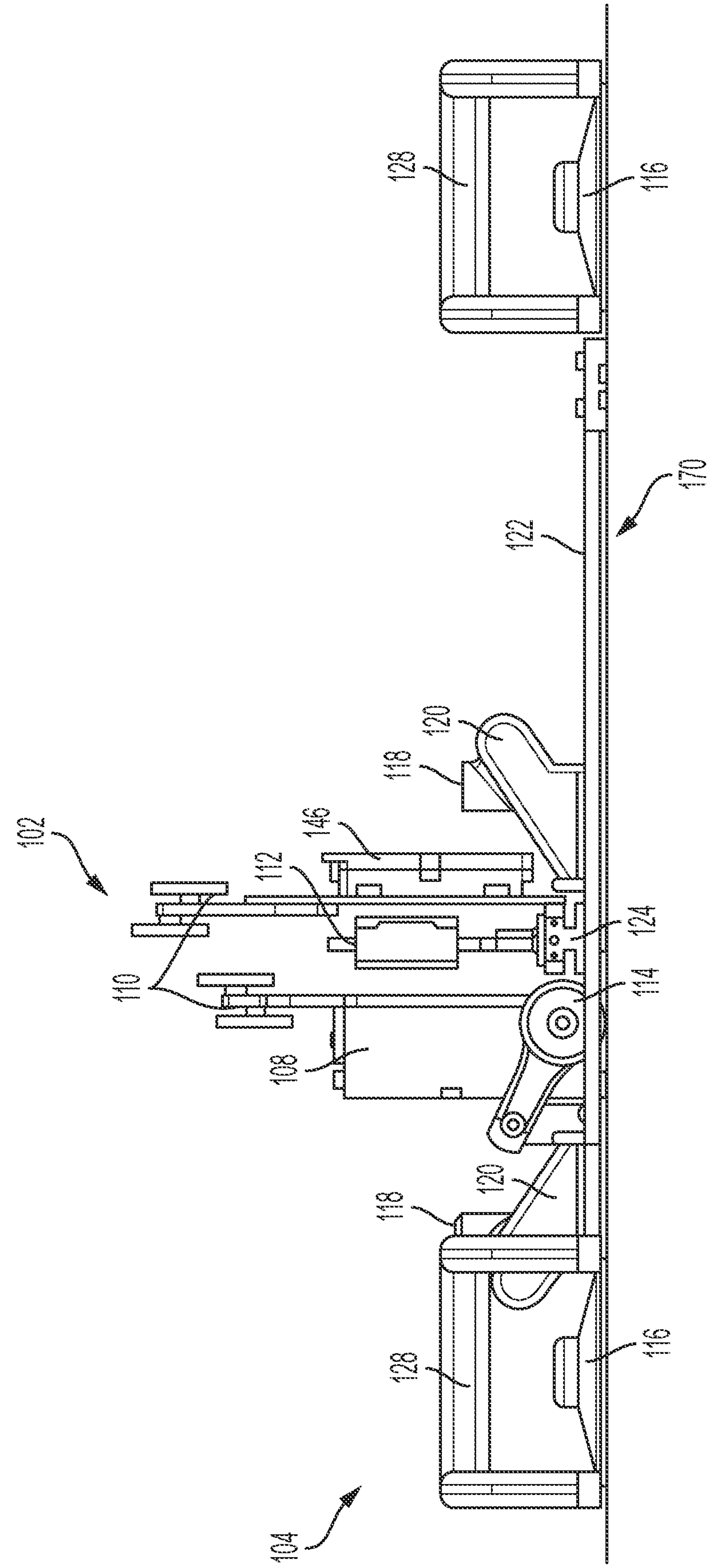
FIG. 4 is an illustration of a side view of the handheld inkjet printer.
Figure 6:
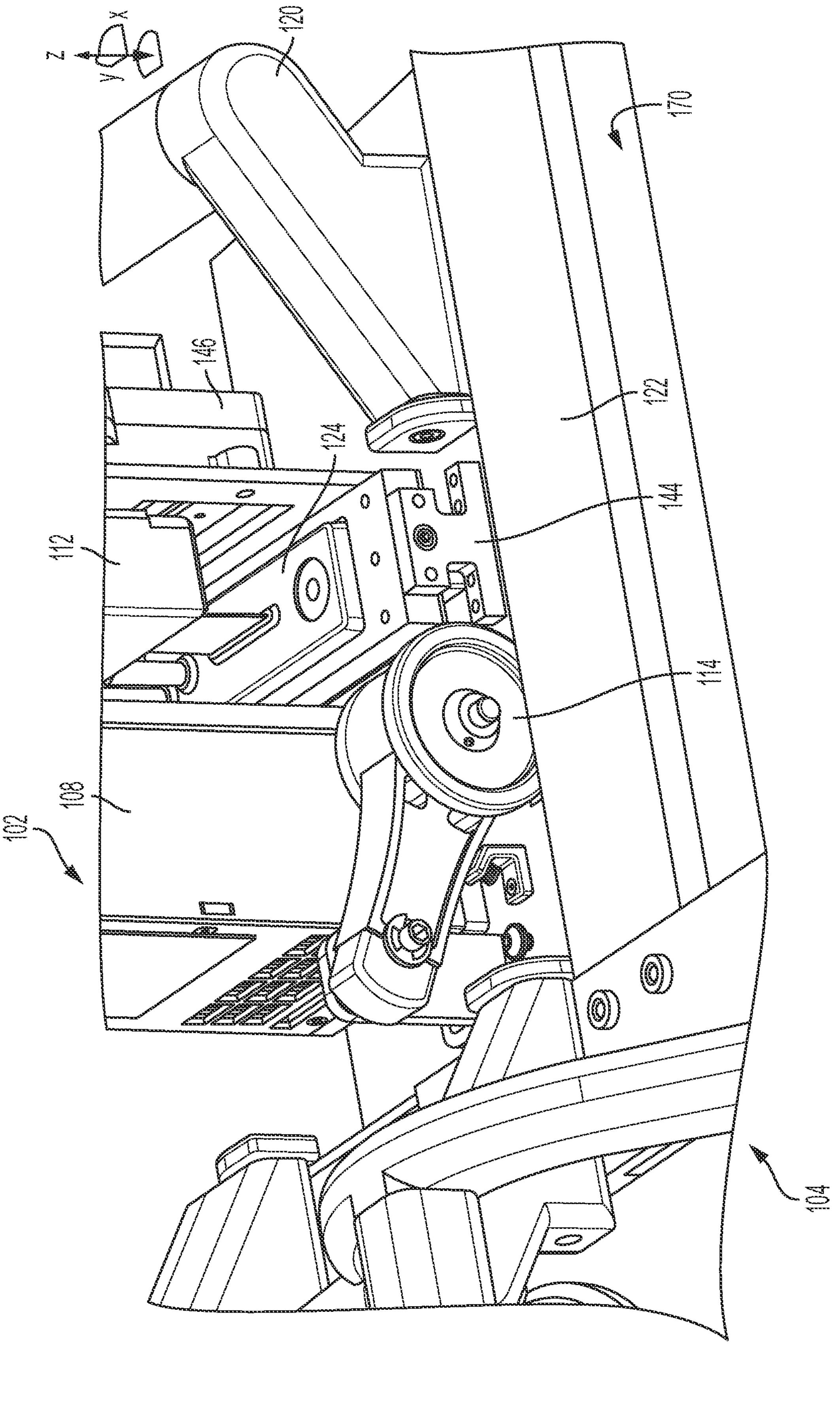
FIG. 6 is an illustration of a magnified, exploded view of the handheld inkjet printer.

FIG. 2 is an overhead view of the handheld inkjet printer 102 and the guide rail system 104. As illustrated, the UV user interface button 118 can be located on two of the one or more handles 120. The handheld inkjet printer 102 includes the printer actuation button 144 that is operable by a user to initiate printing. FIG. 3 illustrates is a bottom view of the handheld inkjet printer 102 and the guide rail system 104. FIG. 4 is a side view of the handheld inkjet printer 102 and the guide rail system 104. FIG. 5 is a magnified, exploded side-view of the handheld inkjet printer 102 and the guide rail system 104 showing the distance sensor/proximity sensor 156 in greater detail. FIG. 6 is a magnified, exploded view of the handheld inkjet printer 102 and the guide rail system 104 showing the distance encoder 114 in greater detail.

Figure 7:
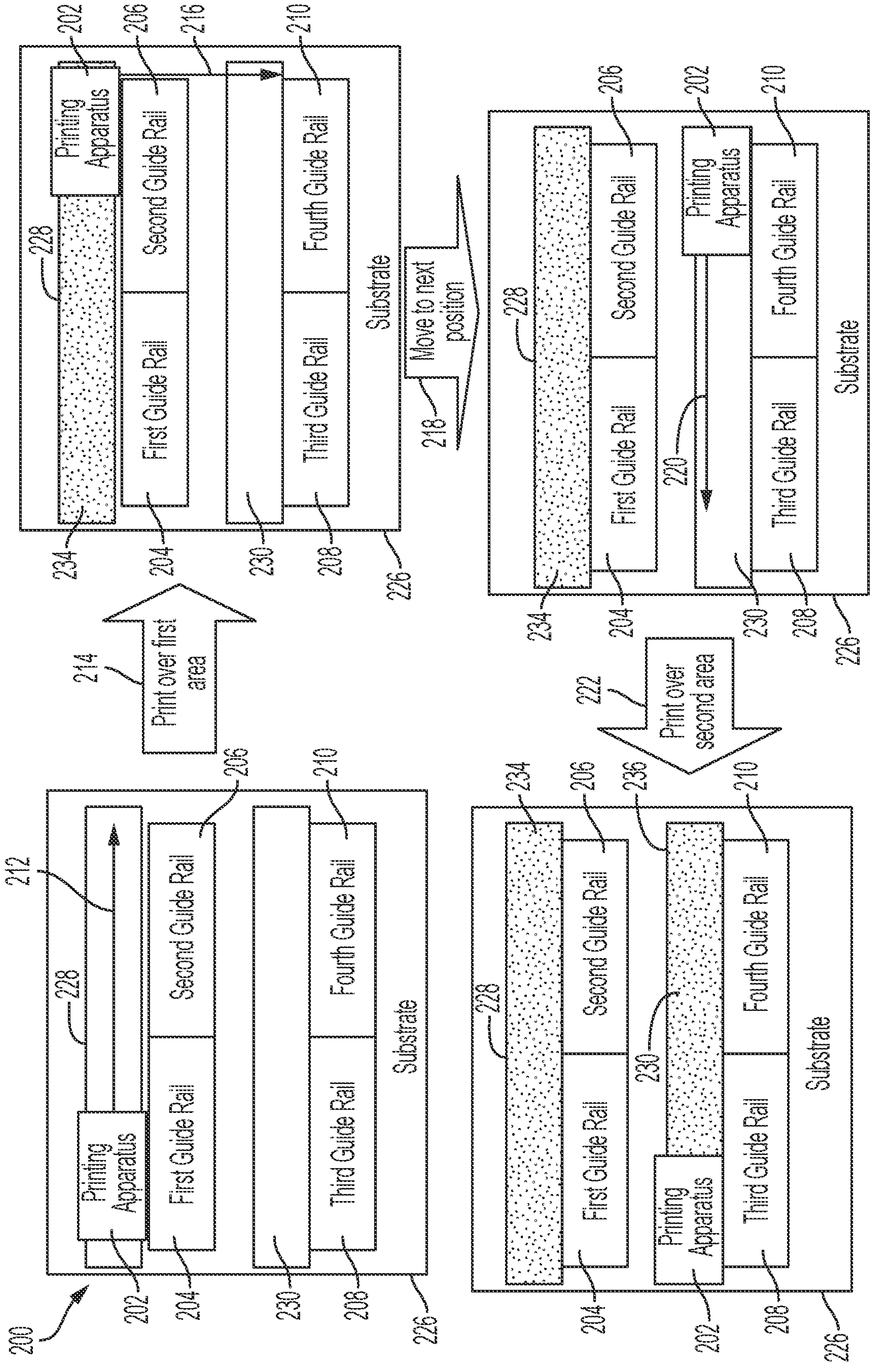
FIG. 7 is an illustration of a process of an example of printing with a printing apparatus.

FIG. 7 illustrates a process 200 of printing with a printing apparatus 202. In detail, the printing apparatus 202 applies, with a printhead of the printing apparatus 202, ink to a substrate 226 as the substrate 226 remains stationary and the printhead of the printing apparatus 202 moves across the substrate 226. The printing apparatus 202 includes a distance encoder, and the printing apparatus 202 determines a distance that the printhead has moved based on sensor data of the distance encoder. The printing apparatus 202 controls application of the ink from the printhead to the substrate 226 based on the distance.

The printing apparatus 202 can initially move in a first direction 212 to print ink 234 on a first printing area 214, 228 of the substrate 226 while the substrate 226 remains stationary. During printing in the first direction 212, the printing apparatus 202 is guided by a first guide rail 204 and a second guide rail 206. The first guide rail 204 and the second guide rail 206 are connected together to increase a size of the first printing area 228 and enable seamless printing over the first printing area 228.

The process 200 includes moving the printing apparatus 202 in second direction 216 different from the first direction 212 to move the printing apparatus 202 to a second printing area 230 while the substrate 226 remains stationary. The second direction 216 is perpendicular to the first direction 212.

Thus, the printing apparatus 202 is moved to a next position 218 for printing on the second printing area 230. During printing in the third direction 220, the printing apparatus 202 is guided by a third guide rail 208 and a fourth guide rail 210. The third guide rail 208 and the fourth guide rail 210 are connected together to increase a size of the second printing area 230 and enable seamless printing over the second printing area 230.

The printing apparatus 202 is then moved in the third direction 220 to print ink 236 on the second printing area 230 while the substrate 226 remains stationary. The printing apparatus 202 prints over the second area 222. The printing apparatus 202 is then in a final position and can be removed from the substrate 226 as printing is completed. The first-fourth guide rails 204, 206, 208, 210 are also removed from the substrate 226 once printing completes.

In some examples, the printing apparatus can be moved from the first printing area 228 to the second printing area 230 in a diagonal direction so that the printing apparatus 202 is placed at the third guide rail 208. To complete printing, the printing apparatus 202 would be moved towards the fourth guide rail 210. In this example, the first direction 212 and third direction 220 are the same.

It is worthwhile to note that the process 200 is applicable to the portable inkjet printing system 100 (FIG. 1-6). For example, the portable inkjet printing system 100 can print over an area by executing process 200 with the portable inkjet printing system 100.

Figure 8:
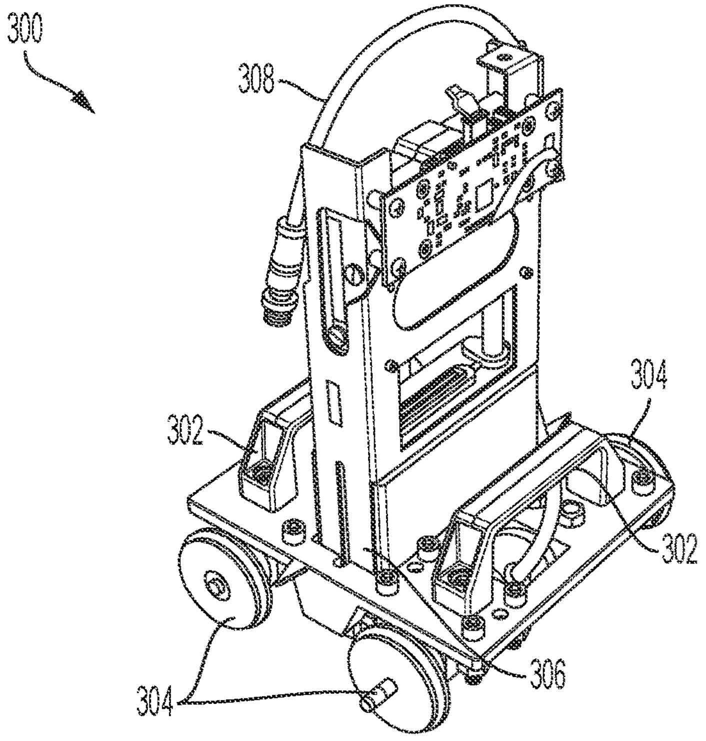
FIG. 8 is an illustration of an example of a printing apparatus.

FIG. 8 illustrates a printing apparatus 300. The printing apparatus 300 includes handles 302 that an operator can grip. The printing apparatus 300 includes a plurality of wheels 304 that directly contact a substrate during printing. The plurality of wheels 304 roll over the substrate and are moveable relative to a printing head 306 to facilitate printing over curved substrates at an appropriate standoff distance. The plurality of wheels 304 each include a biasing mechanism (e.g., springs) to permit such movement. One of the plurality of wheels 304 operates as a distance encoder in this example. The wheels 304 can be made completely from metal. The printing apparatus 300 includes an umbilical cord 308 for connection to an inkjet reservoir.

Figure 9:
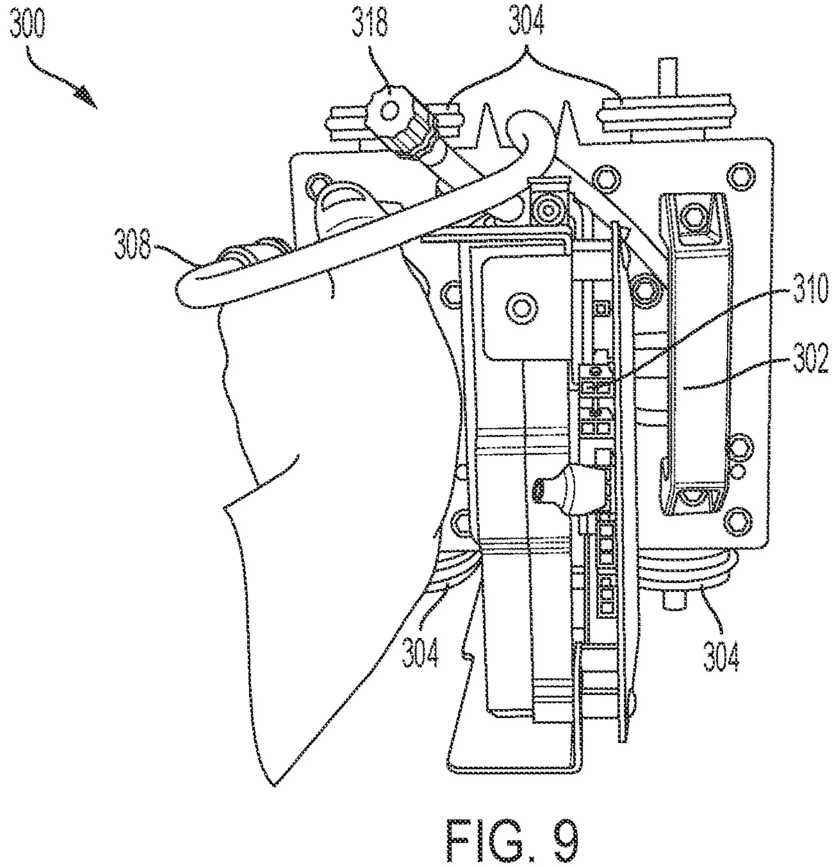
FIG. 9 is an illustration of an example of an overhead view of the printing apparatus.
Figure 10:
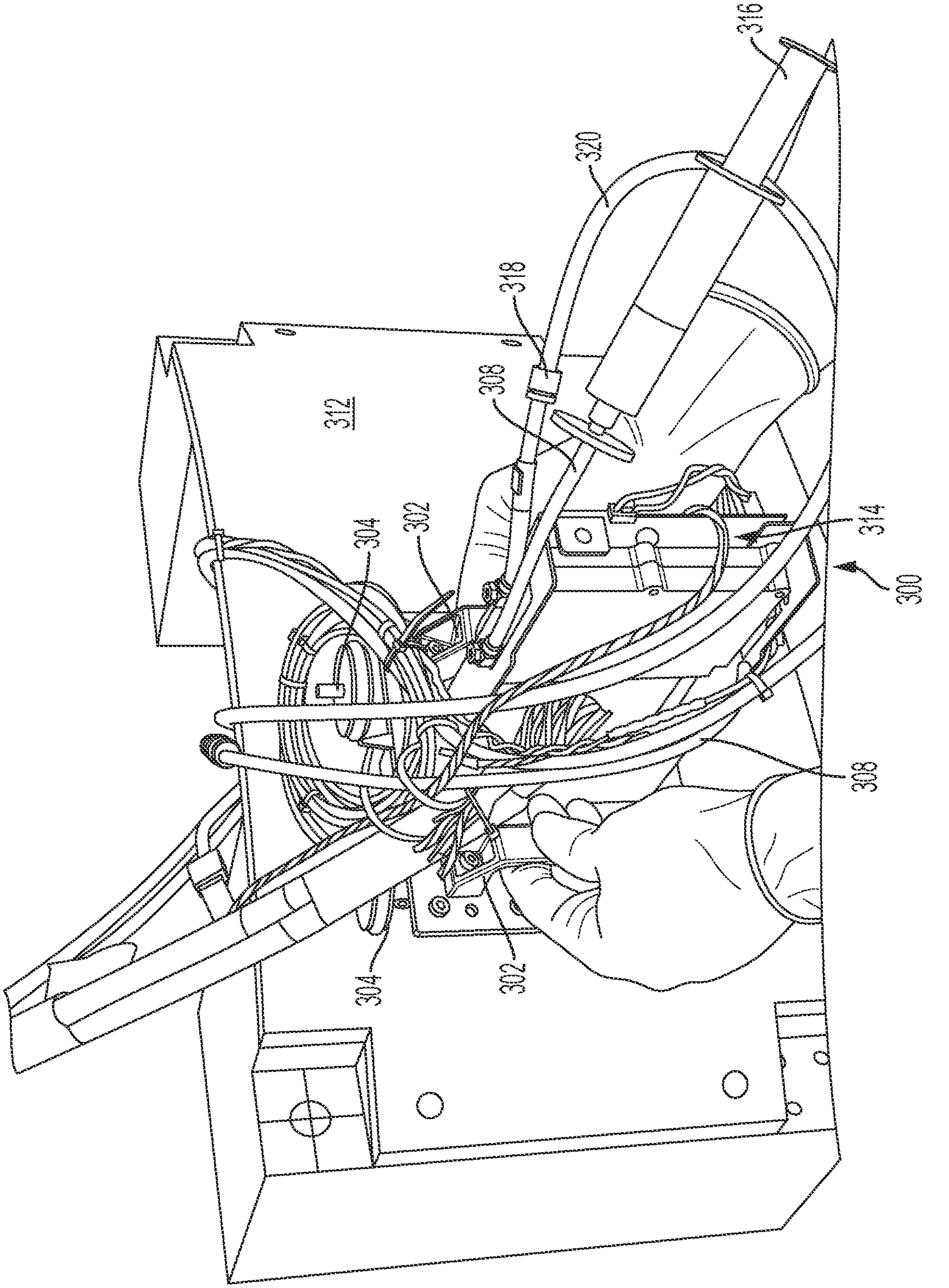
FIG. 10 is an illustration of an example of the printing apparatus printing on a substrate.

FIG. 9 illustrates an overhead view of the printing apparatus 300. An operator is gripping one of the handles 302. Connection area 310 is illustrated. The connection area 310 connect to one or more of a power supply or a computing device (e.g., a controller) during operation to receive power and printing commands. Air connection 318 can connect to an air supply to control air pressure. FIG. 10 illustrates the printing apparatus 300 printing on a substrate 312. Guide rails can be included to facilitate the printing. As illustrated, the wheels 304 are in contact with the substrate 312. The connection area 310 (not visible in this picture) is connected to power and computing device cords 314. The umbilical cord 308 is also connected with a syringe 316 that includes ink. The syringe 316 can be an ink delivery device. The air connection 318 is connected with an air supply connection 320.

It is worthwhile to note that the printing apparatus 300 can be part of the portable inkjet printing system 100 (FIG. 1-6). For example, the printing apparatus 300 can be substituted for the handheld inkjet printer 102. Further, the process 200 (FIG. 7) is applicable to the printing apparatus 300. For example, the printing apparatus 300 can print over an area by executing process 200 with the printing apparatus 300.

Figure 11:
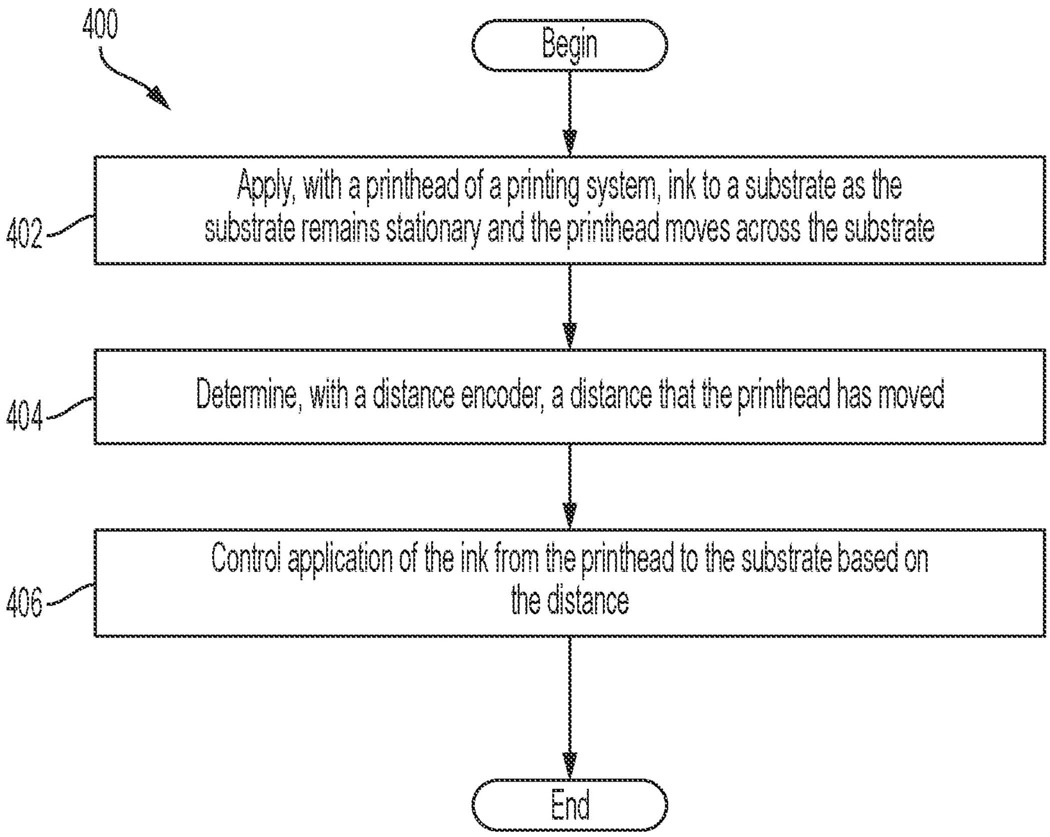
FIG. 11 shows an illustration of operations performed by one embodiment of printing with a printing system.

FIG. 11 shows a method 400 of printing with a printing system. The method 400 is generally implemented by any of the examples described herein. For example, the method 400 is executable by the printing apparatus 300 (FIG. 8-10) and the portable inkjet printing system 100 (FIGS. 1-6). Further, the process 200 (FIG. 7) can be executed in conjunction with method 400.

In an example, the method 400 is implemented at least partly in one or more modules as a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 402 applies, with a printhead of a printing system, ink to a substrate as the substrate remains stationary and the printhead moves across the substrate. Illustrated processing block 404 determines, with a distance encoder, a distance that the printhead has moved. Illustrated processing block 406 controls application of the ink from the printhead to the substrate based on the distance. The method 400 can also include slidably supporting the printhead on a guide rail and guiding the printhead on the guide rail to print over a printing area of the substrate. The method 400 can further include detecting a triggering feature on the guide rail and controlling the printhead to supply the ink in response to the triggering feature being detected. The method 400 can further include releasably attaching the guide rail to the substrate.

The method 400 can further include detecting when the substrate is within a predetermined distance of the printing system. In such examples, the method 400 includes controlling an ultraviolet (UV) lamp to provide UV light to cure the ink based on the printing system being within the predetermined distance. The method 400 can further include maintaining an offset distance between the printhead and the substrate.

The method 400 can further include moving the printhead in a first direction to print on a first area of the substrate while the substrate remains stationary, moving the printhead in second direction different from the first direction to move the printhead to a second area while the substrate remains stationary, and moving the printhead in a third direction to print on the second area while the substrate remains stationary. The first and third directions can be the same, and the first and second directions can be perpendicular to each other.

Further, the disclosure comprises additional examples as detailed in the following clauses below.

Clause 1. A printing system comprising:

a printhead configured to apply ink to a substrate, the printhead including a distance encoder that identifies a distance that the printhead has moved;

a reservoir coupled to the printhead to supply ink to the printhead;

a controller that provides one or more control signals to the printhead to control application of the ink to the substrate based on the distance; and a guide rail system to releasably attach to the substrate and guide the printhead over a printing area of the substrate.

Clause 2. The printing system of clause 1, wherein the guide rail system slidably supports the printhead to guide the printhead over the printing area of the substrate.

Clause 3. The printing system of clause 1, further comprising:

a sensor that detects a triggering feature on the guide rail system, and wherein the controller controls the printhead to apply the ink in response to the triggering feature being detected.

Clause 4. The printing system of clause 3, wherein the sensor is a magnetic sensor or an optical sensor.

Clause 5. The printing system of clause 1, wherein the guide rail system includes a first guide rail and a plurality of mounting members coupled to the first guide rail, wherein the plurality of mounting members is configured to releasably attach to the substrate.

Clause 6. The printing system of clause 1, further comprising:

a proximity sensor to detect when the substrate is within a predetermined distance of the printing system; and an ultraviolet (UV) lamp to provide UV light to cure the ink, wherein the controller provides the one or more control signals to control the UV lamp to provide the UV light based on the substrate being within the predetermined distance.

Clause 7. The printing system of any one of clauses 1 to 6, further comprising:

one or more handles coupled to the printhead, the one or more handles being configured for gripping by an operator guiding the printhead across the printing area of the substrate; and one or more buttons on the one or more handles to control operations of the printing system.

Clause 8. An inkjet printing apparatus comprising:

a printhead configured to apply ink to a substrate and receive one or more control signals, the printhead including a distance encoder that identifies a distance that the printhead has moved, wherein the one or more control signals are associated with application of the ink from the printhead to the substrate based on the distance; and a reservoir coupled to the printhead to supply ink to the printhead.

Clause 9. The inkjet printing apparatus of clause 8, wherein the inkjet printing apparatus further comprises:

one or more spacers to maintain an offset distance between the printhead and the substrate.

Clause 10. The inkjet printing apparatus of clause 9, wherein the one or more spacers include one or more wheels.

Clause 11. The inkjet printing apparatus of clause 10, wherein one of the one or more wheels is the distance encoder.

Clause 12. The inkjet printing apparatus of clause 8, wherein the distance encoder is a laser encoder.

Clause 13. The inkjet printing apparatus of clause 8, wherein the printhead is a piezoelectric printhead.

Clause 14. The inkjet printing apparatus of any one of clauses 8 to 13, wherein the reservoir includes a pressure controller to control a meniscus pressure of the printhead and adjust the meniscus pressure based on an orientation of the printhead.

Clause 15. A method comprising:

applying, with a printhead of a printing system, ink to a substrate as the substrate remains stationary and the printhead moves across the substrate;

determining, with a distance encoder, a distance that the printhead has moved; and controlling application of the ink from the printhead to the substrate based on the distance.

Clause 16. The method of clause 15, further comprising:

slidably supporting the printhead on a guide rail; and guiding the printhead on the guide rail to print over a printing area of the substrate.

Clause 17. The method of clause 16, further comprising:

detecting a triggering feature on the guide rail; and controlling the printhead to supply the ink in response to the triggering feature being detected.

Clause 18. The method of clause 16, further comprising:

releasably attaching the guide rail to the substrate.

Clause 19. The method of clause 15, further comprising:

detecting when the substrate is within a predetermined distance of the printing system.

Clause 20. The method of clause 19, further comprising:

controlling an ultraviolet (UV) lamp to provide UV light to cure the ink based on the printing system being within the predetermined distance.

Clause 21. The method of clause 15, further comprising:

maintaining an offset distance between the printhead and the substrate.

Clause 22. The method of any one of clauses 15 to 21, further comprising:

moving the printhead in a first direction to print on a first printing area of the substrate while the substrate remains stationary;

moving the printhead in second direction different from the first direction to move the printhead to a second printing area while the substrate remains stationary; and moving the printhead in a third direction to print on the second printing area while the substrate remains stationary.

Clause 23. The method of clause 22, wherein the first and third directions are the same.

Clause 24. The method of clause 22, wherein the first and second directions are perpendicular to each other.

Example sizes/models/values/ranges can have been given, although examples are not limited to the same. Arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. The term "coupled" can be used herein to refer to any type of relationship, direct or indirect, between the components in question, and can apply to electrical, mechanical, fluid, optical, electromagnetic, electromechanical, or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. A printing system that comprises:

an inkjet printer that comprises a printhead configured to apply ink to a substrate, wherein the printhead comprises a distance encoder configured to identify a distance that the printhead has moved, wherein the distance encoder includes a wheel encoder that is positioned to be in direct contact with the substrate and supports the printhead;

a reservoir coupled to the printhead to supply the ink to the printhead;

a controller configured to provide one or more control signals to the printhead and control application of the ink to the substrate based on the distance;

a guide rail system configured to releasably attach to the substrate and guide the printhead over a printing area of the substrate, wherein the guide rail system comprises:

a first guide rail configured to releasably support the printhead;

flexible mounting members disposed on opposite sides of the first guide rail and configured to swivel and attach to a curved surface; and a plurality of mounting members coupled to the flexible mounting members, wherein the plurality of mounting members are configured to releasably attach to the substrate;

a main sensor that comprises a magnetic sensor or an optical sensor, wherein the main sensor is configured to detect a triggering feature on the guide rail system, and wherein the controller is further configured to control the printhead to initiate a print operation and cause the printhead to apply the ink to the substrate based on a detection of the triggering feature by the main sensor;

one or more handles coupled to the printhead, the one or more handles configured to be gripped and guide the printhead across the printing area of the substrate;

a proximity sensor configured to detect when the substrate is within a predetermined distance of the printing system;

an ultraviolet (UV) lamp configured to provide UV light to cure the ink that is applied to the substrate; and a UV interface button, on a handle of the one or more handles, configured to depress and actuate the UV lamp;

wherein the controller is further configured to provide the one or more control signals and:

control the UV lamp and cure the ink applied to the substrate by providing the UV light in response to the substrate being within the predetermined distance of the printing system and the UV interface button being depressed at a first time; and disable the UV lamp and disallow the UV light in response to the substrate being determined as no longer being within the predetermined distance of the printing system;

a plurality of flexible cables;

a power supply configured to supply power to the inkjet printer through a first of the flexible cables;

printing consumables configured to provide ink to the inkjet printer through a second of the flexible cables; and a printing pneumatic configured to provide one or more of air or gas to the inkjet printer through a fourth of the flexible cables, wherein the controller is further configured to provide the one or more control signals to the printhead through a third of the flexible cables.

2. The printing system of claim 1, wherein the guide rail system slidably supports the printhead to guide the printhead over the printing area of the substrate.

3. The printing system of claim 1, wherein the guide rail system includes a first guide rail and a plurality of mounting members coupled to the first guide rail, wherein the plurality of mounting members are configured to releasably attach to the substrate.

4. The printing system of claim 1, further comprising:

one or more buttons on the one or more handles to control the printhead to control the application of the ink to the substrate.

5. The printing system of claim 1, wherein the main sensor comprises the magnetic sensor.

6. The printing system of claim 1, wherein the main sensor comprises the optical sensor.

7. A printing apparatus that comprises:

an inkjet printer that comprises a printhead configured to apply ink to a substrate, wherein the printhead comprises a distance encoder that identifies a distance that the printhead has moved, wherein the distance encoder includes a wheel encoder that is positioned to be in direct contact with the substrate and supports the printhead;

a controller configured to provide one or more control signals to the printhead to control application of the ink to the substrate based on the distance;

a guide rail system configured to releasably attach to the substrate and guide the printhead over a printing area of the substrate, wherein the guide rail system comprises:

a first guide rail configured to releasably support the printhead; and flexible mounting members disposed on opposite sides of the first guide rail and configured to swivel and attach to a curved surface; and a plurality of mounting members coupled to the flexible mounting members, wherein the plurality of mounting members are configured to releasably attach to the substrate;

a main sensor that comprises a magnetic sensor or an optical sensor, wherein the main sensor is configured to detect a triggering feature on a guide rail system, and wherein, based upon a detection of the triggering feature by the main sensor, the controller is configured to control the printhead to initiate a print operation and cause the printhead to apply the ink to the substrate;

one or more handles coupled to the printhead, the one or more handles being configured to be gripped and guide the printhead across a printing area of the substrate;

a proximity sensor configured to detect when the substrate is within a predetermined distance of the printing apparatus;

an ultraviolet (UV) lamp configured to provide UV light and cure the ink that is applied to the substrate;

a UV interface button, on a handle of the one or more handles, configured-to depress and actuate the UV lamp;

wherein the controller is further configured to provide the one or more control signals and:

control the UV lamp and cure the ink applied to the substrate by providing the UV light in response to the substrate being within the predetermined distance of the printing apparatus and the UV interface button being depressed, and disable the UV lamp and disallow the UV light in response to the substrate being determined as no longer being within the predetermined distance of the printing apparatus;

a plurality of flexible cables;

a power supply configured to supply power to the inkjet printer through a first of the flexible cables;

printing consumables configured to provide ink to the inkjet printer through a second of the flexible cables; and a printing pneumatic configured to provide one or more of air or gas to the inkjet printer through a fourth of the flexible cables, wherein the controller is further configured to provide the one or more control signals to the printhead through a third of the flexible cables.

8. The printing apparatus of claim 7, wherein:

the guide rail system slidably supports the printhead to guide the printhead over the printing area of the substrate; and the inkjet printer is a handheld inkjet printer.

9. The printing apparatus of claim 7, wherein the printing apparatus comprises the guide rail system, and wherein the guide rail system includes a first guide rail and a plurality of mounting members coupled to the first guide rail, wherein the plurality of mounting members is configured to releasably attach to the substrate.

10. The printing apparatus of claim 7, further comprising:

one or more buttons on the one or more handles to control the printhead to control the application of the ink to the substrate.

11. The printing apparatus of claim 7, wherein the main sensor comprises the magnetic sensor.

12. The printing apparatus of claim 7, wherein the main sensor comprises the optical sensor.

13. A method comprising:

applying, with an inkjet printer comprising a printhead, ink to a substrate;

supporting the printhead with a wheel encoder directly contacting the substrate detecting, with the wheel encoder, a distance that the printhead has moved;

providing, with a controller, one or more control signals to the printhead to control controlling-application of the ink to the substrate based on the distance;

detecting, with a main sensor comprising a magnetic sensor or an optical sensor, a triggering feature on a guide rail system configured to releasably attach to the substrate and guide the printhead over a printing area of the substrate, the guide rail system comprising a first guide rail releasably supporting the printhead, flexible mounting members disposed on opposite sides of the first guide rail and configured to swivel and attach to a curved surface;

supplying power from a power supply configured to the inkjet printer through a first of a plurality of flexible cables;

printing consumables providing ink to the inkjet printer through a second of the plurality of flexible cables;

providing the one or more control signals to the printhead through a third of the plurality of flexible cables;

a printing pneumatic providing one or more of air or gas to the inkjet printer through a fourth of the plurality of flexible cables;

coupling a plurality of mounting members to the flexible mounting members, wherein the plurality of mounting members are releasably attachable to the substrate;

controlling, with the controller, the printhead initiating a print operation to and applying the ink to the substrate based on the main sensor detecting the triggering feature;

detecting, with a proximity sensor, when the substrate is within a predetermined distance of a printing system comprising the printhead;

providing ultraviolet (UV) light with a UV lamp to cure the ink that is applied to the substrate;

detecting whether a UV interface button is depressed by an operator, wherein the UV interface button actuates the UV lamp, the UV interface button being on one or more handles coupled to the printhead, the one or more handles being configured for gripping by the operator guiding the printhead across a printing area of the substrate;

curing, by controlling the UV lamp, the ink applied to the substrate by providing the UV light in response to the substrate being within the predetermined distance of the printing system and the UV interface button being depressed; and disallowing, by disabling the UV lamp, the UV light in response to determining the substrate as no longer being within the predetermined distance of the printing system.

14. The method of claim 13, further comprising slidably supporting, with the guide rail system, the printhead to guide the printhead over the printing area of the substrate, wherein the inkjet printer is a handheld inkjet printer.

15. The method of claim 13, wherein the guide rail system includes a first guide rail and a plurality of mounting members coupled to the first guide rail, the method further comprising releasably attaching the plurality of mounting members to the substrate.

16. The method of claim 13, wherein the detecting includes detecting with the magnetic sensor.

17. The method of claim 13, wherein the detecting includes detecting with the optical sensor.

18. The printing system of claim 1, further comprising the system being a handheld inkjet printer.

19. The printing system of claim 1, wherein to control the UV lamp to cure the ink, the controller controls the UV lamp to provide the UV light when the UV lamp is positioned to provide UV light to the ink that is applied to the substrate, and further wherein the controller turns the UV lamp off when the UV lamp is positioned over gaps between the ink that is applied to the substrate.

20. The printing system of claim 1, wherein the controller is configured to turn off the UV lamp in response to the UV interface button being depressed at a second time after the first time.

* * * * *